Nov. 2, 1971 KAZUMA MATSUI ET AL 3,616,782
FUEL SUPPLY DEVICE FOR INTERNAL COMBUSTION ENGINES
Filed Dec. 23, 1969 7 Sheets-Sheet 1
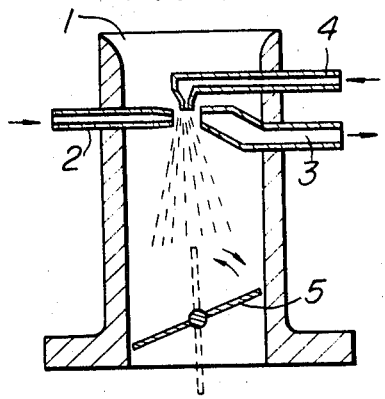
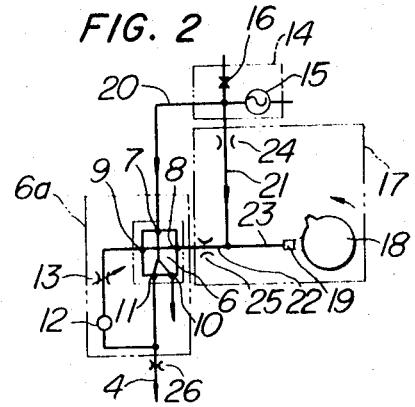
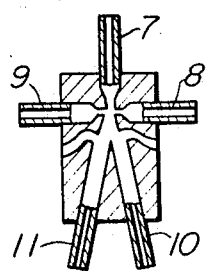
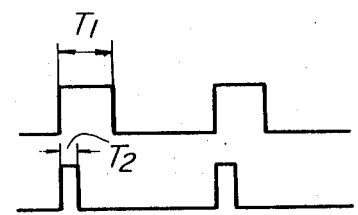
INVENTORS
Kazuma Matsui
Takashi Yamada
BY Cushman, Darby & Cushman
ATTORNEYS

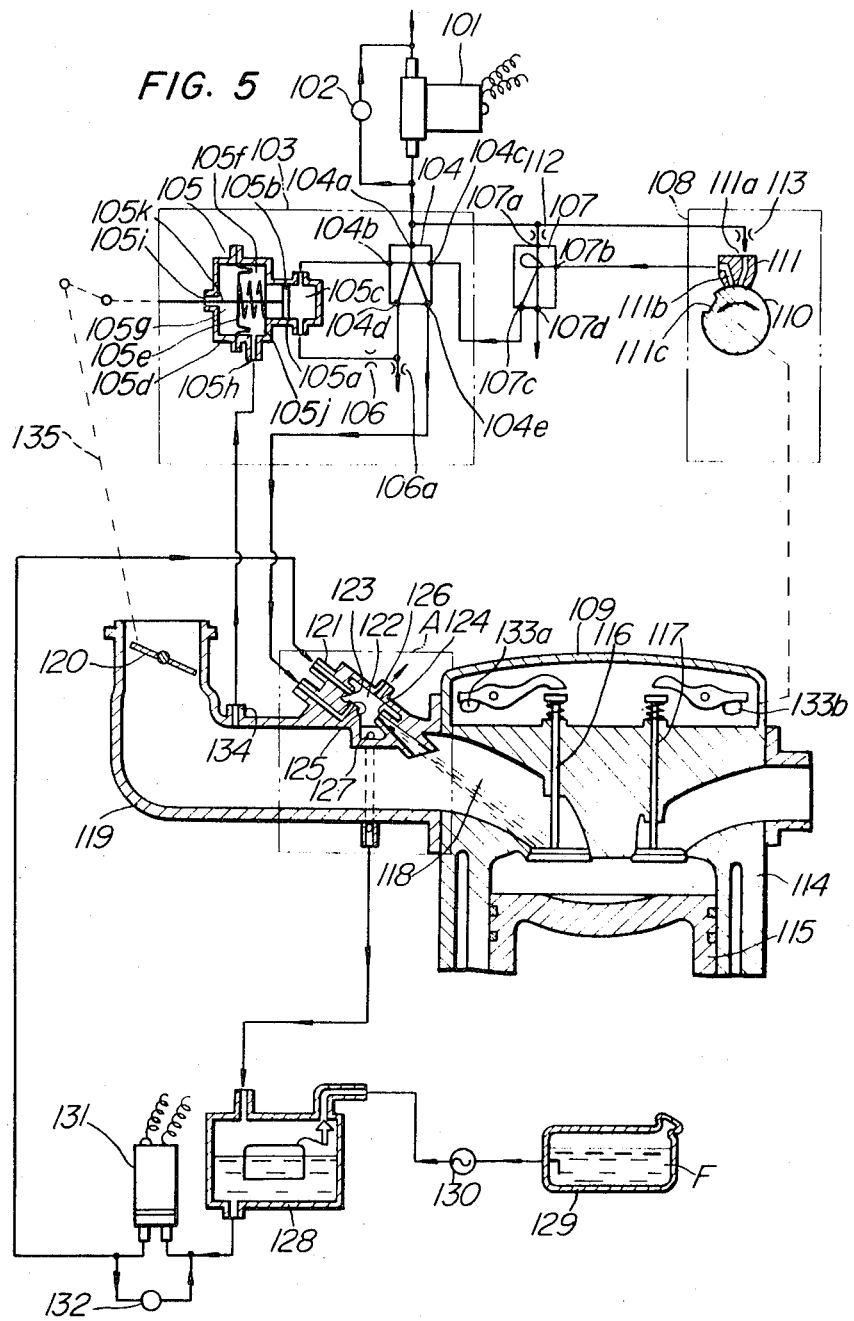

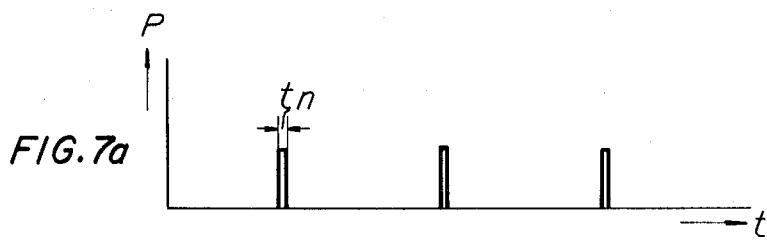
FIG. 7a
FIG. 7b
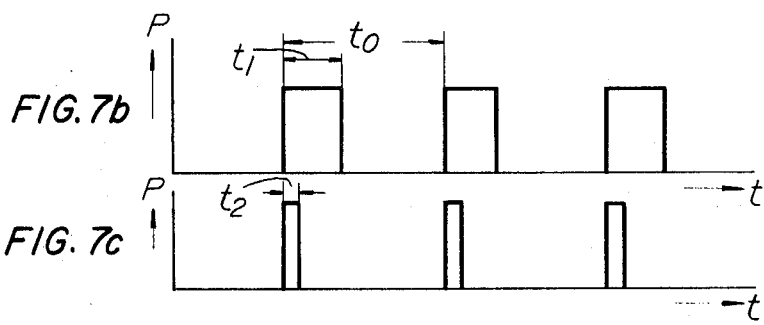
FIG. 7c
FIG. 7d
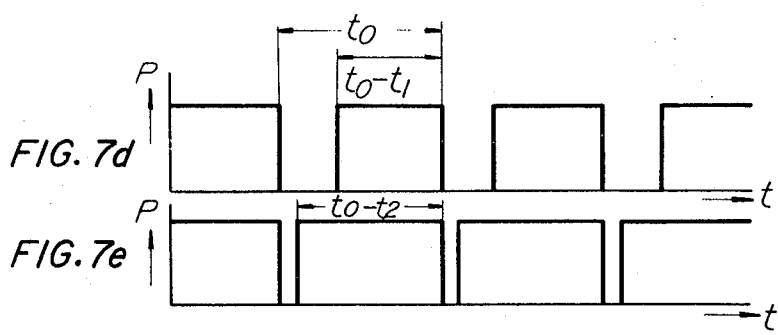
FIG. 7e
FIG. 9
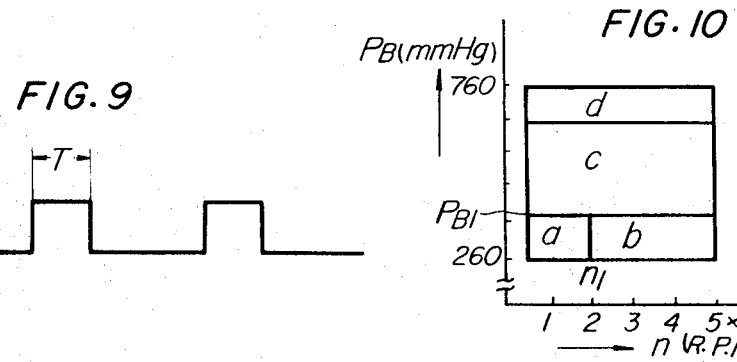
FIG. 10

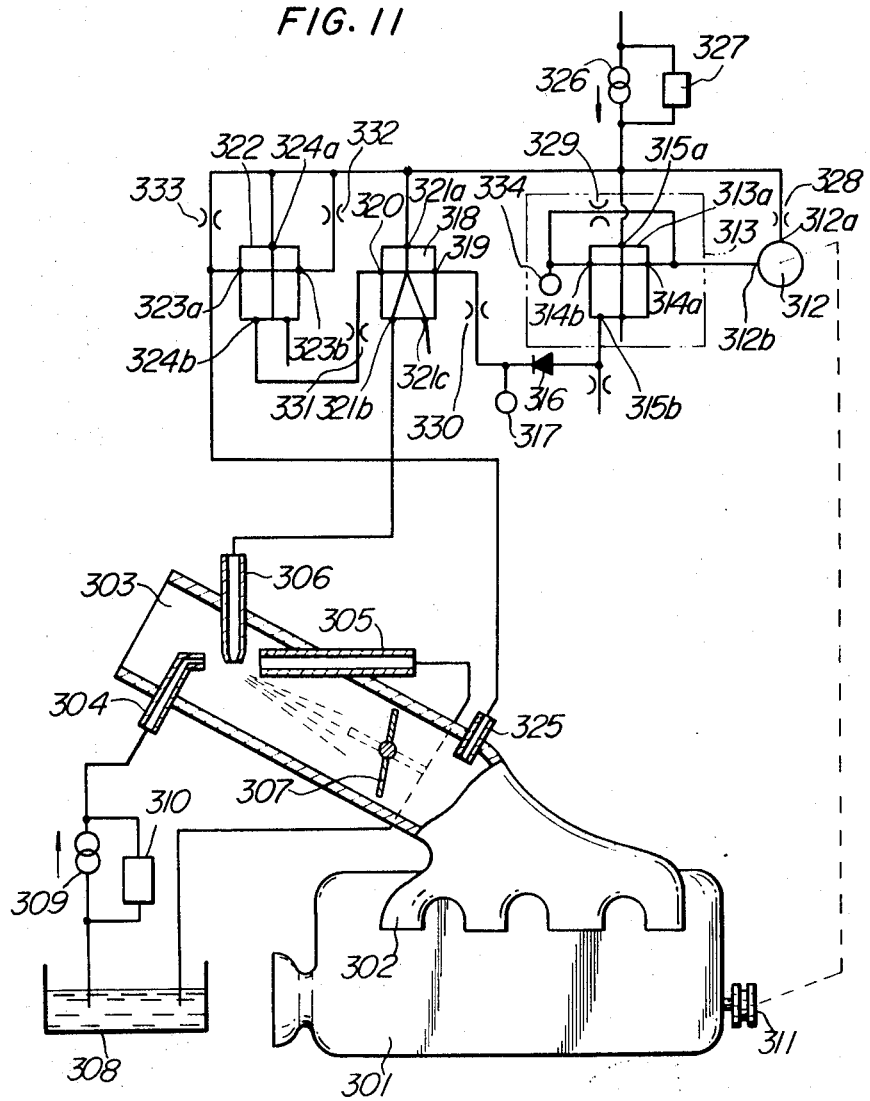

United States Patent Office 3,616,782
Patented Nov. 2, 1971

3,616,782
FUEL SUPPLY DEVICE FOR INTERNAL COMBUSTION ENGINES
Kazuma Matsui, Toyohashi-shi, and Takashi Yamada, Anjo-shi, Japan, assignors to Nippondenso Kabushiki Kaisha, Kariya-shi, Aichi-ken, Japan
Filed Dec. 23, 1969, Ser. No. 887,609
Claims priority, application Japan, Dec. 27, 1968, 43/862
Int. Cl. F02m 37/14; F15c 1/00
U.S. Cl. 123—119 R          14 Claims

ABSTRACT OF THE DISCLOSURE

A fuel supply device for internal combustion engines, wherein fuel such as gasoline or other fluid fuel is controllably injected into suction air to be supplied to the engine as a fuel-air mixture, characterized in that the fuel is continuously ejected from a fuel ejecting nozzle under a constant pressure throughout the period of engine operation and whether a fuel jet ejected from said nozzle is supplied into the suction air or received by a fuel receiver to be returned to a fuel reservoir is determined by an air jet which controllably traverses the fuel jet. The performance of said air jet is controlled by supplying compressed air to an air ejecting nozzle in a form of air pulses which are modified from a constant fluid supply by a fluidic control circuit or fluid multivibrator oscillated by a fluidic or air trigger pulse generator driven in synchronism with the engine. Frequency and duration of the air pulses determine the amount of fuel supplied to the engine.

BACKGROUND OF THE INVENTION

(1) Field of the invention

This invention relates to a fuel supply device for internal combustion engines of the type wherein air inhaled through an air suction pipe is supplied with fuel to form a fuel-air mixture and introduced into engine cylinders.

(2) Description of the prior art

As fuel supply devices for producing a fuel-air mixture to be supplied to engine cylinders of internal combustion engines, there are known suction type carburators which utilize a vacuum generated in the air suction pipe, mechanical fuel injection devices which inject fuel into a suction manifold or directly into cylinders and electro-mechanical fuel injection devices which include electronic control means.

However, the mechanical or electro-mechanical fuel injection devices are complicated in their structures and high in their costs of manufacture, and therefore, they are rarely used except the case of some internal combustion engines for special uses.

The suction type carburetors are widely used at present and are generally classified into two types of fixed and variable Venturi tubes. In these carburetors, fuel is drawn and ejected from a nozzle due to a vacuum generated by a pressure drop of suction air through a Venturi portion of the air suction pipe. In the carburetors of the type of fixed Venturi tube, there may be provided at least three systems for low, medium and high speed operations to meet with a wide range of variation of air flow speed through Venturi tubes, and in this case the structure is somewhat complicated and still there is a disadvantage that the changing over among these three systems makes it difficult to obtain a smooth operation of an engine.

The abovementioned disadvantage is avoided in the carburetors of the type of variable Venturi tube. However, in these carburetors, a variable throttling means, a variable Venturi tube and linkage mechanisms for operating the variable Venturi tube in response to the vacuum in an air suction pipe of an engine require high precision manufacture and the structure is also relatively complicated, resulting in a relatively high cost of manufacture.

SUMMARY OF THE INVENTION

Accordingly, the main object of this invention is to provide a novel fuel supply device for internal combustion engines, which is simple in structure and superior in operation.

Another object of this invention is to provide a fuel supply device for internal combustion engines, wherein the amount of fuel to be supplied is positively controlled according to the opening of a suction air throttling valve and/or the vacuum in an air suction pipe.

Still another object of this invention is to provide a fuel supply device for internal combustion engines, wherein the amount of fuel to be supplied is positively controlled according to the rotational speed of the engine.

To accomplish the abovementioned main object, this invention provides a fuel supply device for internal combustion engines, comprising a fuel-air mixture supply passage leading to fuel-air mixture inlet ports of engine cylinders, a fuel ejecting nozzle adapted to be supplied with fuel under a constant pressure and to continuously eject the fuel therefrom, a fuel receiver adapted to selectively receive the fuel ejected from said fuel ejecting nozzle and to return it to a fuel reservoir, an air ejecting nozzle adapted to be selectively supplied with pressurized air as output air pulses of a fluidic control circuit or fluid multi-vibrator and to deviate the fuel jet ejected from said fuel ejecting nozzle in a manner to control an amount of fuel received by said fuel receiver, said fuel-air mixture supply passage being supplied with such a portion of the fuel ejected from said fuel ejecting nozzle that is not received by said fuel receiver, a fluidic or air trigger pulse generator adapted to give air trigger pulses to said fluid multi-vibrator in synchronism with revolution of the engine to cause said output air pulses, and means for determining the duration of each pulse of said output air pulses of said fluid multi-vibrator.

BRIEF DESCRIPTION OF THE DRAWING

In the accompanying drawing:
FIG. 1 is a schematic longitudinal section of a nozzle-receiver assembly according to this invention;
FIG. 2 is a diagrammatic illustration of an air pulse generating portion of a fuel supply device according to this invention;
FIG. 3 is a schematic longitudinal section of a fluid multi-vibrator element;
FIGS. 4a and 4b are graphs showing two examples of air pulse output of a multi-vibrator incorporated in the device shown in FIG. 2;
FIG. 5 is a diagrammatic illustration of a second embodiment of the fuel supply device according to this invention;
FIGS. 7a to 7e are graphs showing examples of pulse performance of the fuel supply device shown in FIG. 5;
FIG. 9 is a graph showing a pulse performance of the fuel supply device shown in FIG. 8;
FIG. 10 is a graphic illustration of an example of specifying fuel-air ratio according to the rotational speed of an engine and the vacuum in a suction manifold;

FIG. 11 is a diagrammatic illustration of a fourth embodiment of the fuel supply device according to this invention;

FIGS. 12a to 12c are graphs showing modification of pulses in the fuel supply device shown in FIG. 11.

DESCRIPTION OF THE PREFERRED EMBODIMENTS

Figure 6A:
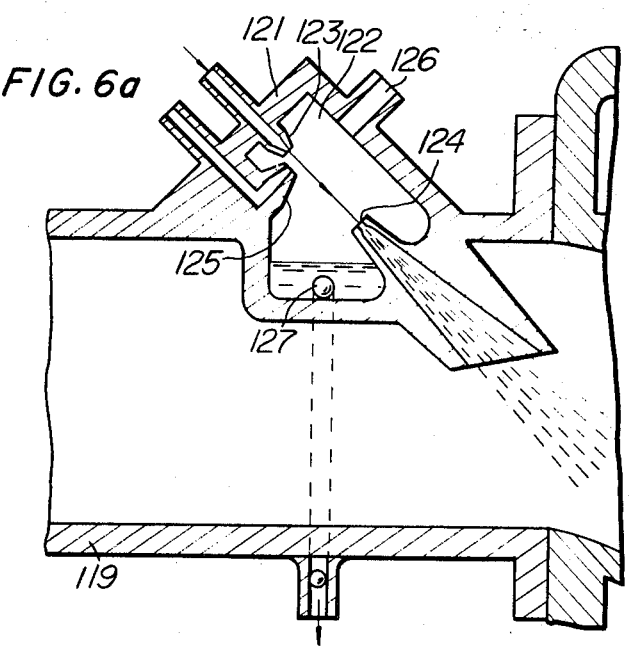
FIGS. 6a and 6b are schematic illustrations showing the operation of the nozzle-receiver assembly in the embodiment shown in FIG. 5.

In the following, this invention will be explained in the form of some preferred embodiments with reference to the accompanying drawing.

Referring to FIG. 1, there is shown a nozzle-receiver assembly according to this invention in a schematic longitudinal section, wherein 1 designates a part of an air suction tube which is opened at its upper end to the atmosphere and is connected at its lower end to a suction manifold of an engine not shown. Transversely to the tube 1, there are provided a fuel ejecting nozzle 2 and a fuel receiver 3 with each open end in closely opposing relation at a central portion of the tube 1. At a clearance between the opposing open ends of the fuel ejecting nozzle 2 and the fuel receiver 3, there is opening an air ejecting nozzle 4 in a manner to blow an air jet traversing the fuel jet ejected from the nozzle 2 toward the receiver 3. The fuel nozzle 2 is continuously supplied with fuel at a constant pressure during the operation of the engine and the receiver 3 is so adapted as to receive all of the fuel ejected from the nozzle 2 if there is no air jet ejected from the air ejecting nozzle 4, and to return the fuel to a fuel reservoir not shown. However, if the air ejecting nozzle 4 is supplied with compressed air, an air jet ejected from the nozzle 4 deviates the fuel jet ejected from the nozzle 2 by spraying such portion of fuel, which, therefore, is not received by the receiver 3 but is supplied through the tube 1 as a fuel-air mixture to the suction manifold of the engine. The tube 1 is provided with a throttling valve 5 at a downstream position of the nozzle-receiver assembly.

The air ejecting nozzle 4 is supplied with compressed air at a properly controlled rate according to the requirement for fuel supply, and the compressed air is supplied in the form of air pulses according to the invention. FIG. 2 shows diagrammatically a most simple embodiment of a device for generating such air pulses. In FIG. 2, reference numeral 6 shows a single stable type fluid multi-vibrator element as shown in detail in FIG. 3, which has an input port 7, control ports 8 and 9 and output ports 10 and 11. One of the output ports or the port 10 is opened to the atmosphere and the other output port 11 is connected to the air ejecting nozzle 4. Furthermore, air output at the output port 11 is introduced to the control port 9 via an air tank 12 and a variable throttling valve 13, both constituting a timer element for determining a time constant of a feed back line. Thus, an assembly shown collectively by reference numeral 6a constitutes an element which modifies a constant compressed air supply at the input port 8 into a compressed air output in the form of pulses as shown in FIG. 4a or 4b according to air trigger pulses supplied at the control port 8. The constant compressed air supply is accomplished by an air source means designated by 14, which includes an air compressor 15 and a constant pressure valve 16. The above-mentioned air trigger pulses are generated by an air trigger pulse generator designated by 17, wherein a switching rotor 18 which is rotated in synchronism with the rotation of the engine intermittently closes a control port 19, whereby an air pressure is established through air lines 21 and 22, which otherwise are left free of pressure because air from the air source means 14 is exhausted through a line 23. Reference numerals 24, 25 and 26 designate fixed throttling means provided in the air lines 21 and 22 and a line leading to the air ejecting nozzle 4, respectively.

In operation, the compressor 15 is driven by a motor not shown and the fuel ejecting nozzle 2 is continuously supplied with fuel such as gasoline from a fuel pump not shown. As the engine is started, the switching rotor 18 simultaneously starts to rotate in synchronism with the rotation of the engine to intermittently close the port 19 thereby to give the air trigger pulses to the control port 8 of the fluid multi-vibrator element 6 at a rate proportional to the rotational speed of the engine. These air trigger pulses cause the air flow output in the form of pulses of the same rate at the output port 11 of the fluid multi-vibrator 6. The air output pulses are supplied to the air ejecting nozzle 4 to generate corresponding air jets, whereby the fuel ejected from the fuel ejecting nozzle 2 is deviated and supplied into the air to be fed to the suction manifold of the engine as long as each air pulse is maintained at the air ejecting nozzle 4. The amount of fuel supplied to the engine is therefore determined by the rate or frequency of the air pulses as well as the duration of each pulse. The frequency of the air pulses depends upon the rotational speed of the engine, while the duration of each pulse is determined by the capacity of the air tank 12 and the resistance of the variable throttling valve 13. By properly controlling the resistance of the valve 13 in response to the engine load, the duration of the air pulses is changed to be $T_1$ or $T_2$ as shown in FIGS. 4a or 4b.

FIG. 5 shows a second embodiment of the fuel supply device according to this invention. In this embodiment, a compressor 101 adapted to be, for example, electrically driven constitutes a compressed air source of a constant pressure by cooperation of a constant pressure valve 102 and supplies air to a fluidic control circuit or fluid multi-vibrator assembly collectively designated by 103 as well as to a trigger pulse generator 108. The fluid multi-vibrator assembly includes a single stable type fluid multi-vibrator element 104, which is substantially same as the element 6 shown in FIG. 3 and has an input port 104a, control ports 104b and 104c and output ports 104d and 104e.

Reference numeral 105 designates a variable fluidic capacitance or air capacity means adapted to control the time constant of a feed back line for supplying the signal at the output port 104d to the control port 104b of the multi-vibrator element 104. The means 105 has a cylinder 105a in which is slidably provided a piston 105b defining a variable capacity chamber 105c. To operate the piston 105b, there is provided a diaphragm means 105d including a diaphragm 105e defining diaphragm chambers 105f and 105g. The chamber 105f is supplied with the vacuum in the air suction pipe through a port 105h and the chamber 105g is opened to the atmosphere through a port 105i. The diaphragm 105e is resiliently urged leftward seen in FIG. 5 by a compression spring 105j, and therefore, the piston 105b which is firmly connected with the diaphragm 105e via piston rod 105k is normally kept at its most leftward position when there exists no vacuum in the chamber 105f, and at this time the capacity of the chamber 105c is the largest. In this embodiment, the flow resistance in the feed back line of the fluid multi-vibrator assembly is a fixed fluidic resistance or throttling valve 106.

Reference numeral 107 designates a one-shot type fluid multi-vibrator element which is interposed between the fluidic trigger pulse generator 108 and the fluidic control circuit or fluid multi-vibrator assembly 103. The fluid multi-vibrator 107 has an input port 107a, a control port 107b and output ports 107c and 107d. In this fluid multi-vibrator element, an air pulse supplied at the control port 107b is directly fed back with a very short time lag within the element, and therefore, the air supplied at the input port 107a is converted to output pulses of a very short duration at the output port 107c regardless of the duration of the air trigger pulses supplied to the control port 107b. The input port 107a is connected to the air source 101 via a throttling means 112, while the output port 107d is opened to the atmosphere.

The air trigger pulse generator 108 includes a switching rotor 110 adapted to be driven in synchronism with the engine, and when a concave 111c of the rotor meets with passages 111a and 111b of a head 111, air is allowed from the passage 111a to the passage 111b to generate a pulse. The passage 111a is supplied with compressed air from the source 101 via a throttling means 113.

In FIG. 5, the engine 109 includes a cylinder block 114 within which a piston 115 is provided. The cylinder block is provided with a suction valve 116 and an exhaust valve 117. A suction passage 118 of the engine is connected with an air suction tube 119 in which are provided a throttling valve 120 and a nozzle-receiver assembly 121. The nozzle-receiver assembly in this second embodiment includes a fuel ejecting nozzle 123 adapted to be continuously supplied with fuel at a constant pressure to eject it as a fuel jet through a receiver chamber 122 and a fuel supply passage 124 into the air suction tube 119. An air ejecting nozzle 125 is opening to the receiver chamber 122 in a manner to blow an air jet which traverses the fuel jet ejected from the fuel ejecting nozzle 123. The receiver chamber is opened to the atmosphere through an opening 126 and a bottom portion there of is connected through a port 127 to a fuel reservoir 128. The air ejecting nozzle 125 is connected to the output port 104e of the fluid multi-vibrator element 104.

Fuel F such as gasoline is transferred from a fuel tank 129 to the fuel reservoir 128 by a fuel transfer pump 130 and then is pumped to the fuel ejecting nozzle 123 at a constant pressure by an electrically driven fuel pump 131 incorporated with a constant pressure valve 132.

Reference numerals 133a and 133b designate cam shafts of the engine, with which is operatively connected the switching rotor 110 of the air trigger pulse generator 108.

The pressure or vacuum in the air suction tube 119 is taken out through a port 134 and introduced into the chamber 105f of the variable air capacity means 105. The opening condition of the throttling valve 120 is transmitted via a resilient linkage 135 to the piston rod 105k.

In operation, the air compressor 101 and the fuel pump 131 are continuously driven throughout the period of engine operation. When the engine was started, the switching rotor 110 is rotated in synchronism with the rotation of the engine and supplies the air trigger pulses to the control port 107b of the fluid multivibrator element 107. By this fluid multi-vibrator element 107, the air trigger pulses from the fluidic or air trigger pulse generator 108 are converted into short and sharp air trigger pulses having a short duration $t_n$ as shown in FIG. 7a, which are delivered from the output port 107c of the element 107. As these sharpened air trigger pulses are supplied to the control ports 104c of the fluid multi-vibrator element 104, the output port 104d thereof delivers output pulses as shown in FIG. 7b or 7c according to the time constant of the feed back line including the air chamber 105c and the throttling means 106, wherein if the time constant is large, the duration of each pulse is as long as $t_1$ and if the time constant is small, the duration becomes as short as $t_2$, while the period $t_0$ between the adjacent pulses is determined by the rotational speed of the engine. On the other hand, at the output port 104e of the element 104, there appear air pulses as shown in FIG. 7d or 7e, which are complementarily corresponding to the air pulses shown in FIG. 7b or 7c.

Figure 6B:
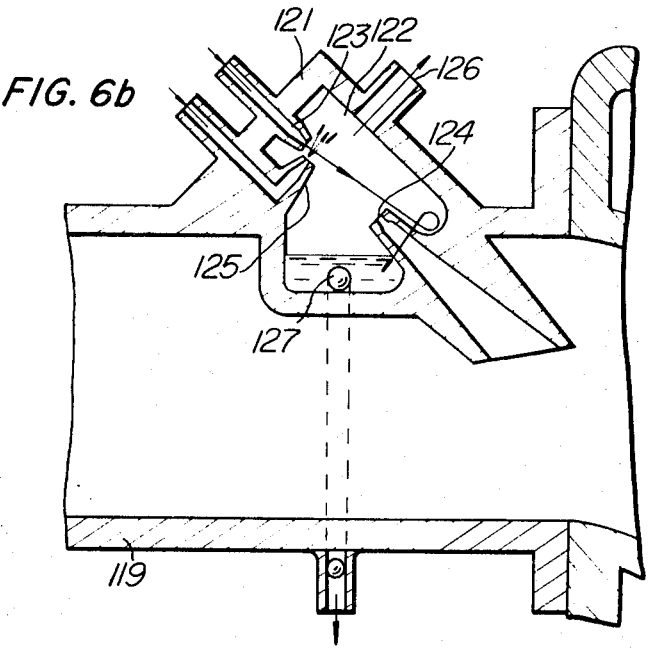

As shown in FIGS. 6a and 6b, the fuel ejected from the fuel ejecting nozzle 123 is supplied into the air suction tube 119 when the air ejecting nozzle 125 is not supplied with compressed air, while the fuel ejected from the fuel ejecting nozzle 123 is diverted from the fuel supply passage 124 to be caught by the receiver chamber 122 when the air ejecting nozzle 125 is supplied with compressed air. Accordingly, with reference to FIG. 7d or 7e, the period $t_0-t_1$ or $t_0-t_2$ during which an air jet is ejected from the air ejecting nozzle 125 is a period during which the air suction tube is not supplied with fuel, and the remaining period $t_1$ or $t_2$ during which the air ejecting nozzle 125 is at rest is a period during which the air suction tube is supplied with fuel.

The output port 104d is opened to the atmosphere through a throttling means 106a and the feed back line is taken from the upstream of the throttling means 106a. If the engine output power is to be decreased, the throttling valve 120 is moved toward closing position, whereby the piston rod 105f is moved rightward seen in FIG. 5 to decrease the volume of the chamber 105c. The vacuum in the air suction tube 119, which will be lower as the engine speed is higher for a determined position of the throttling valve 120, also acts to decrease the volume of the chamber 105c. As the volume of the chamber 105c becomes smaller, the time constant of the feed back line becomes smaller, whereby the duration of the air pulses considered in FIG. 7b or 7c becomes shorter. As the result, the amount of fuel supplied into the air suction tube 119 is decreased.

Figure 8:
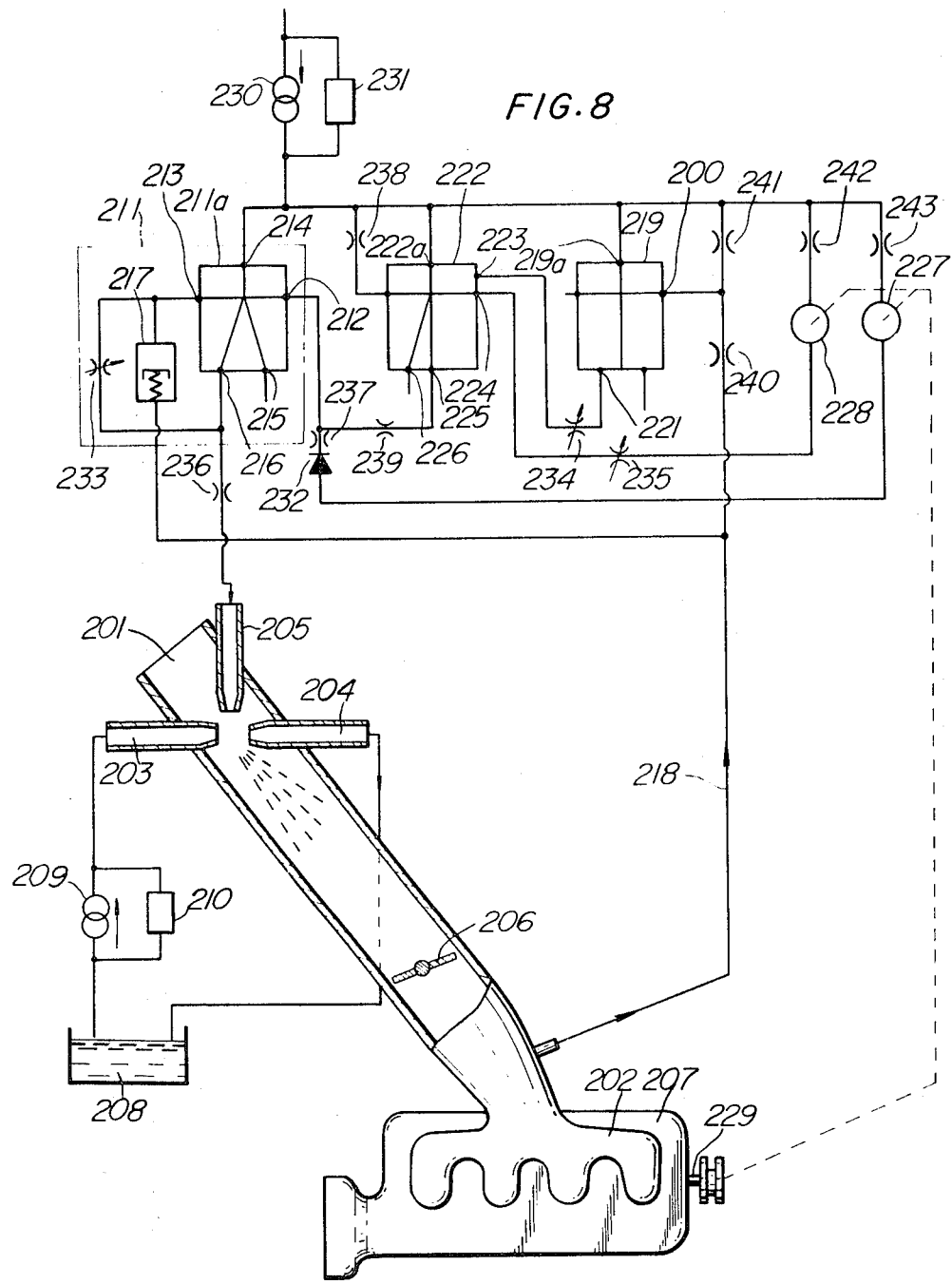
FIG. 8 is a diagrammatic illustration of a third embodiment of the fuel supply device according to this invention.

In the third embodiment shown in FIG. 8, an air suction tube 201 connected to a suction manifold 202 is provided with a nozzle-receiver assembly including a fuel ejecting nozzle 203, a fuel receiver 204 and an air ejecting nozzle 205 adapted to operate in the same manner as those shown in FIG. 1. A throttling valve 206 is provided in the air suction tube 201 and is operated to control the output of an engine 207 by a linkage means not shown. Fuel in a fuel tank 208 is supplied by a pump 209 cooperating with a constant pressure valve 210 to the fuel ejecting nozzle 203 and the fuel received by the fuel receiver 204 is returned to the tank 208.

A fluid multi-vibrator assembly collectively designated by 211 includes a single stable type fluid multi-vibrator element 211a having control ports 212 and 213, an input port 214 and output ports 215 and 216 and a feed back line for feeding the output of the port 216 back to the control port 213 including a variable capacity air reservoir 217 and a variable air throttling valve 233. The fluid multi-vibrator assembly 211a of this invention operates in the same manner as the assembly 6a shown in FIG. 2 except that the capacity of the reservoir 217 is varied according to the vacuum in the suction manifold 202 through a conduit 218.

Reference numeral 219 shows a fluid proportional amplifier element having an input port 219a, a control port 220 and an output port 221. This element functions to produce an air output which is proportional to the intensity of a control signal or air pressure supplied at the control port 220. Another element designated by 222 is an or-nor element having an input port 222a, control ports 223 and 224 and output ports 225 and 226. This element functions to deliver an air output at the port 225 only when both of the control signals supplied to the ports 223 and 224 are lower than respective predetermined levels. Reference numeral 227 designated an air trigger pulse generator which is driven by a shaft 229 of the engine 207 and adapted to produce air trigger pulses at a rate proportional to the rotational speed of the engine. Another element 228 which is also driven by the engine is an analogue type rotation-pressure converter. Compressed air is supplied by a compressor 230 cooperating with a constant pressure valve 231. Air trigger pulses generated by the air trigger pulse generator 227 are supplied via a fluid rectifier 232 to the control port 212 of the fluid multi-vibrator element. The air output from the output port 221 of the fluid proportional amplifier element 219 is supplied via a variable throttling means 134 to the control port 223 of the or-nor element 222, and the air output from the analogue type rotation-pressure converter 228 is supplied via a variable throttling means 235 to the control port 224 of the or-nor element 222. Elements designated by reference numerals 236 to 243 are all fixed throttling means. The elements 211a, 222, 219, 228 and 227 are all supplied with compressed air from the air source 230. The control port 220 of the fluid proportional amplifier element 219 is supplied with the vacuum in the suction manifold 202 through the conduit 218.

In operation, the fuel pump 209 and the air compressor 230 are continuously operated throughout the period of engine operation. If the engine was started, the air trigger pulse generator 227 is rotated in synchronism with the rotation of the engine and delivers air trigger pulses which are supplied to the control port 212 of the fluid multi-vibrator element 211a through the fluid rectifier 232 and the throttling means 237. By the air trigger pulses being supplied at the control port 212, the fluid multivibrator element 211a, which otherwise delivers its air output at the output port 215, delivers air output at the output port 216, whereby the air ejecting nozzle 205 is supplied with compressed air pulses and fuel is correspondingly supplied into the air flowing to the suction manifold in the same manner as described with reference to FIGS. 1 and 2. The air output at the port 216 is fed back to the control port 213 through the variable throttling means 233 and the variable capacity means 217 to return the output from the port 216 to 215 after a time lag which is determined by the time constant of the feed back line.

Now, for a preferable operation of the engine, it is desirable that the fuel-air ratio in the suction air supplied to the engine is controlled according to the vacuum in the suction manifold as well as the rotational speed of the engine. Especially when the amount of fuel supply is controlled depending upon the vacuum in the suction manifold, there is a tendency for the fuel-air ratio to become relatively lower at an operating condition where the engine speed as well as the vacuum in the suction manifold are both low. An example of such an operating condition is shown in FIG. 10 by a region $a$, wherein the rotational speed $n$ of the engine is lower than $n_1$ and the vacuum $P_B$ in the suction manifold is lower than $P_{B1}$. Such a problem is solved in this third embodiment. The analogue type rotation-pressure converter 228, which is driven in synchronism with the rotation of the engine, delivers an air output which is proportional to the rotational speed of the engine, said output being supplied to the control port 224 via the variable throttling means 235. On the other hand, the fluid proportional amplifier element 219, which is supplied with the vacuum in the suction manifold 202 as a control signal at the control port 220 thereof, delivers a lowering air output at the port 221 as said vacuum lowers, said air output being supplied to the control port 223 of the or-nor element 222 via the variable throttling means 234. If the rotational speed of the engine as well as the vacuum in the suction manifold are simultaneously lower than respective predetermined levels, an output appears at the output port 225 or a "nor" port of the or-nor element 222. The air output at the port 225 is supplied to the control port 212 of the fluid multivibrator 211a via the throttling means 239 and delays the switching-over of the output of the fluid multi-vibrator element 211a from the port 216 to the port 215, whereby a properly elongated duration T (FIG. 9) of the air pulses to be supplied to the air ejecting nozzle 205 is obtained. By properly adjusting the throttling means in the system shown in FIG. 8, it is possible to obtain such conditions as exemplarily shown in FIG. 10, wherein the fuel-air ratios in ranges $a$, $b$, $c$ and $d$ are expected to be 1/13, 1/15, 1/16 and 1/12, respectively.

It will be apparent that the device shown in FIG. 8 is readily modified for the nozzle-receiver assembly of the type as shown in FIG. 5. In such a case, the air ejecting nozzle must only be connected to the output port 215 of the fluid multi-vibrator element 211a, while the output port 216 of the element 211a is opened to the atmosphere through a throttling means at the downstream of a branch for the feedback line.

FIG. 11 shows a fourth embodiment of the fuel supply device according to this invention. In this embodiment, a suction manifold 302 of an engine 301 is supplied with fuel-air mixture by a nozzle-receiver assembly of the type shown in FIG. 1, which includes an air suction tube 303, a fuel ejecting nozzle 304, a fuel receiver 305 and an air ejecting nozzle 306. The air suction tube is equipped with a throttling valve 307 adapted to be controlled by a proper control linkage not shown. Fuel in a fuel tank 308 is continuously supplied at a constant pressure to the fuel ejecting nozzle 304 by a fuel pump 309 cooperating with a constant pressure valve 310 throughout the period of engine operation and the fuel received by the receiver 305 is returned to the tank. An output shaft 311 of the engine drives an air trigger pulse generator 312 having an input port 312a and an output port 312b.

Reference numeral 313 designates collectively a fluid one-shot multi-vibrator assembly including a single stable type fluid multi-vibrator 313a which has control ports 314a and 314b, an input port 315a and an output port 315b. The output port 312b of the air trigger pulse generator 312 is directly connected to the control port 314a of the fluid multi-vibrator element 313a and also connected to the other control port 314b via a throttling means 329 and a capacity means 334, whereby when air trigger pulses are dispatched from the air trigger pulse generator 312, there appear such corresponding air pulses as shown in FIG. 12a at the output port 315b of the element 313a. The output port 315b is connected to a control port 319 of a fluid multi-vibrator element 318 via a fluid rectifier 316, a capacity means 317 and a throttling means 330. The element 318 has an input port 321a, output ports 321b and 321c and another control port 320. The output port 321b is connected to the air ejecting nozzle 306, while the output port 321c is opened to the atmosphere. Reference numeral 322 designates a fluid proportional amplifier element having an input port 324a, control ports 323a and 323b and an output port 324b. The control port 323a is connected to a port 325 for detecting the vacuum in the suction manifold 302. An air compressor 326 cooperating with a constant pressure valve 327 constitutes an air source of a constant pressure, which supplies air to the air trigger pulse generator 312 through a throttling means 328, to the input port 315a of the fluid multivibrator element 313a, to the input port 321a of the fluid multi-vibrator element 318 and to the input port 324a of the fluid proportional amplifier element 322. The output port 324b of the element 322 is connected to the control port 320 of the fluid multi-vibrator element 318 through a throttling means 331, and the control ports 323a and 323b are connected with the air source 326 through throttling means 333 and 332.

In operation, the air compressor 326 as well as the fuel pump 309 are kept in operation throughout the period of engine operation. If the engine 301 is started, the air trigger pulse generator 312 is driven and delivers air trigger pulses to the fluid one-shot multi-vibrator assembly 313, which, as described before, delivers such air pulses as shown in FIG. 12a. These are pulses are modified as they are passed through the fluid rectifier 316, capacity means 317 and throttling means 330 to such a waving flow of air as shown in FIG. 12b. On the other hand, the output port 324b delivers such a substantially flat air output as shown in a dotted line in FIG. 12b, the level of which depends upon the vacuum in the suction manifold 302 in such a manner that the level of said air output becomes higher as said vacuum becomes lower. If the fluid multi-vibrator element 318 is supplied with the waving air flow signal at the control port 319 and the substantially flat air flow signal at the control port 320, an output air flow from the output port 321b becomes such pulses as shown in FIG. 12c, and the duration T of such pulses is determined by a difference of level c as shown in FIG. 12b. Therefore, it will be appreciated that as the vacuum in the suction manifold becomes lower, the difference c becomes larger and accordingly the duration T of the air pulses supplied to the air ejecting nozzle 306 becomes shorter, whereby the amount of fuel supplied to the engine becomes smaller.

It will be apparent that the fuel supply device of this third embodiment can readily be modified for the nozzle-receiver assembly as shown in FIG. 5. When the nozzle-receiver of the type as shown in FIG. 5 is incorporated, the air ejecting nozzle thereof must of course be connected to the output port 321c of the fluid multi-vibrator element 318.

Figure 13:
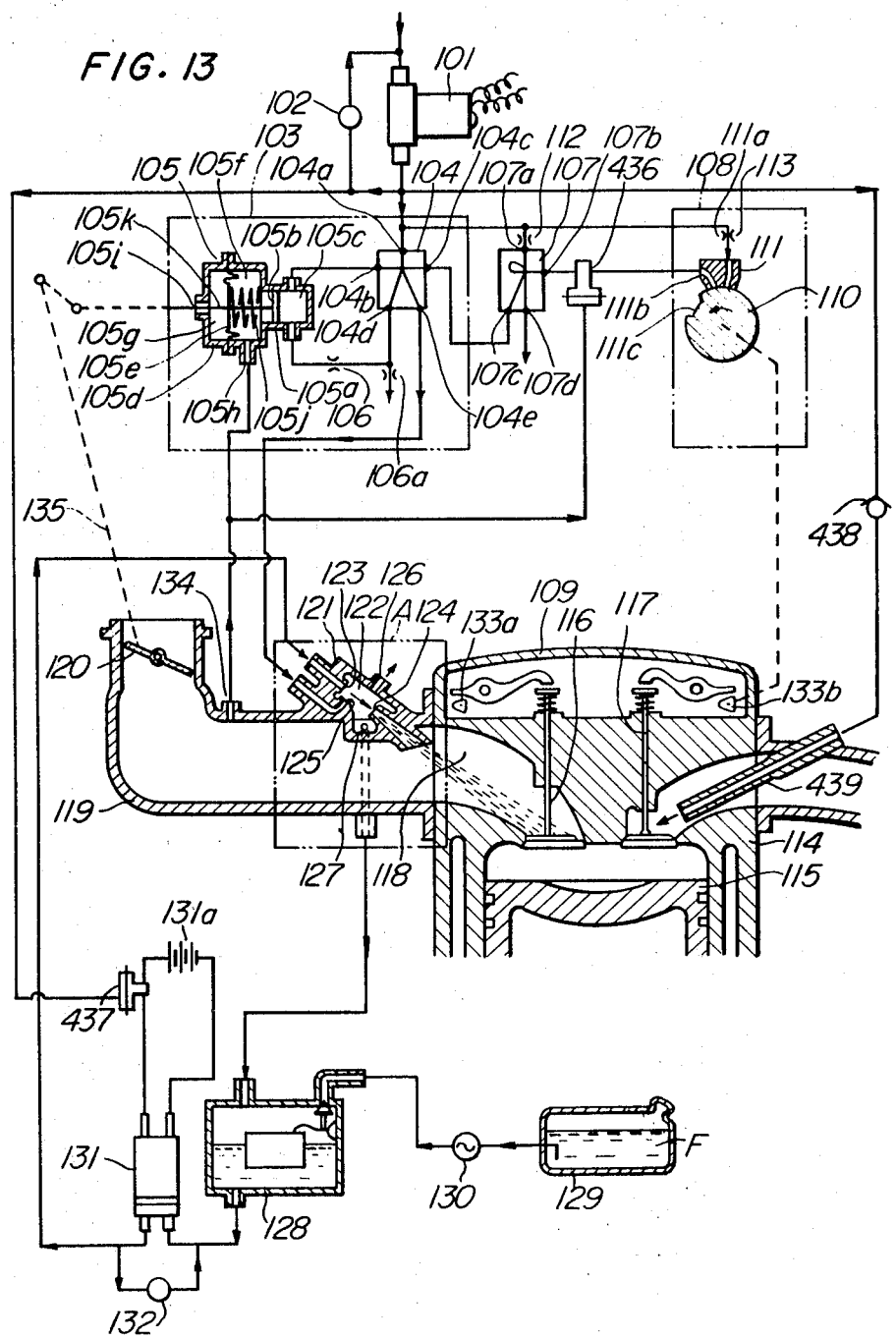
FIG. 13 is a diagrammatic illustration of a fifth embodiment of the fuel supply device according to this invention.

A further embodiment of the fuel supply device shown in FIG. 13 is in most portions thereof identical with the embodiment shown in FIG. 5, and such portions as identical with the former embodiment are shown by the same reference numerals. In addition to the embodiment shown in FIG. 5, this embodiment includes a shut-off valve 436 adapted to intercept the air trigger pulses to be supplied at the control 107b of the fluid multi-vibrator element 107 when the vacuum in the air suction tube 119 has abruptly lowered. By the provision of this valve, fuel supply to the engine is temporarily wholly stopped when the engine output is to be rapidly lowered, whereby very rapid deceleration of the engine is attained and fuel loss is decreased to a minimum. Furthermore, air contamination due to imperfect combustion of fuel, which are apt to occur at such a rapidly decelerating condition in conventional fuel supply devices, is completely avoided. Although in FIG. 13 the shut-off valve 436 is controlled by the vacuum in the air suction tube 119 taken out from the port 134, the valve 436 may be controlled by a linkage in relation to the operation of the throttling valve 120.

Another additional provision in this fifth embodiment shown in FIG. 13 is a fuel pump shut-off switch 437 which is adapted to open a power circuit 131a for the fuel pump 131 when the air supply by the compressor 101 has failed. By this provision, the situation is avoided wherein an excessive amount of fuel is supplied to the engine when the control air supply line has failed, which otherwise causes imperfect combustion, after burning and other serious troubles.

Furthermore, the fuel supply device shown in FIG. 13 includes an air ejecting nozzle 439 adapted to be supplied air from the air source 101 via a check valve 438 and to eject the air toward the exhaust valve 117. By the provision of this nozzle, perfect combustion of fuel remaining in the exhaust gas is accomplished, much contributing to the prevention of air pollution.

Although several particular embodiments of this invention have been described in the above, it will be appreciated that various modifications can be applied to these embodiments without departing from the spirit of this invention.

We claim:

1. A fuel supply device for internal combustion engines, comprising:
   a fuel-air mixture supply passage leading to fuel-air mixture inlet ports of engine cylinders,
   a fuel ejecting nozzle means for continuously ejecting fuel therefrom,
   a fuel receiver means for selectively receiving the fuel ejected from said fuel ejecting nozzle means and for returning it to a fuel reservoir,
   an air ejecting nozzle,
   a fluid multi-vibrator means for selectively supplying pressurized air output pulses to said air ejecting nozzle for deviating the fuel jet ejected from said fuel ejecting nozzle thereby controlling the amount of fuel received by said fuel receiver,
   said fuel-air mixture supply passage being supplied with the portion of the fuel ejected from said fuel ejecting nozzle that is not received by said fuel receiver,
   a fluid trigger pulse generator means for providing air trigger pulses to said fluid multi-vibrator in synchronism with the revolutions of the engine to trigger said output air pulses, and
   means connected to said fluid multi-vibrator for controlling the duration of each pulse of said output air pulses of said fluid multi-vibrator.

2. A fuel supply device for an internal combustion engine having fuel-fluid mixture inlet ports for engine cylinders, said device comprising:
   a pressurized fluid source,
   a fuel supply source,
   a fuel ejecting nozzle means for continuously ejecting a fuel jet therefrom supplied by said fuel supply source,
   a fuel receiving means for selectively receiving fuel ejected from said fuel ejecting nozzle means and for returning the received fuel to a fuel reservoir,
   a fluid ejecting nozzle means for deviating the fuel jet in response to supplied pressurized fluid pulses thereby selectively determining the amount of fuel passed to said fuel-fluid mixture inlet ports by determining whether said fuel jet is routed to said receiving means or to said inlet ports,
   fluidic control circuit means connected to said pressurized fluid source for supplying said pressurized fluid pulses to said fluid ejecting nozzle means,
   fluidic trigger pulse generator means connected to said control circuit means for providing fluidic trigger pulses thereto in synchronism with the revolutions of the engine thereby triggering said pressurized fluid pulses and determining the repetition rate thereof, and
   means connected to said control circuit means for controlling the duration of each of said pressurized fluid pulses therefrom whereby the amount of fuel actually supplied to said inlet ports is a function of both the engine revolutions and the duration of the pressurized fluid pulse.

3. A fuel supply device according to claim 2, wherein said fuel receiving means receives substantially the whole amount of fuel ejected from said fuel ejecting nozzle means when said fluid ejecting nozzle means is not ejecting a fluid jet.

4. A fuel supply device according to claim 2, wherein said fuel receiving means receives substantially the whole amount of fuel ejected from said fuel ejecting nozzle means when said fluid ejecting nozzle means is ejecting a fluid jet.

5. A fuel supply device according to claim 2, wherein said means for determining the duration of each pulse of said pressurized fluid pulses of said fluidic control circuit is a fluidic feed back line including fluidic resistance and fluidic capacitance elements adapted to counterbalance said fluidic trigger pulses with a determined time lag.

6. A fuel supply device according to claim 5, wherein said fluidic resistance element is a variable fluidic resistance element controlled in response to the vacuum in said fuel-air mixture supply passage.

7. A fuel supply device according to claim 5, wherein said fluidic capacitance element is a variable fluidic capacitance element controlled in response to the vacuum in said fuel-air mixture supply passage.

8. A fuel supply device according to claim 7, wherein said variable fluidic capacitance element is further controlled in response to the opening of a throttling valve in said fuel-air mixture supply passage.

9. A fuel supply device according to claim 2, wherein said fluidic trigger pulses generated by said fluidic trigger pulse generator means are given to said fluidic control circuit via a one-shot type of fluid multi-vibrator.

10. A fuel supply device according to claim 5, further comprising a fluidic Or-Nor element and wherein said fluidic trigger pulses are supplemented to elongate their duration with a pressurized fluidic output of said or-nor element which delivers said fluidic output only when the revolutions of the engine as well as the vacuum in said fuel-air mixture supply passage are simultaneously lower than respectvie predetermined values.

11. A fuel supply device according to claim 2, wherein said fluidic trigger pulses generated by said fluidic trigger pulse generator means are deformed into generally triangular shaped pulses by a one-shot multi-vibrator, rectifier, fluidic resistance and fluidic capacitance elements, said triangular shaped pulses being counterbalanced by a fluidic output of a fluid proportional amplifier which is controlled by the vacuum in said fuel-air mixture supply passage to bias said triangular shaped trigger pulses and to modify the effective duration thereof.

12. A fuel supply device according to claim 4, wherein an interlock means is provided to stop the supply of fuel to said fuel ejecting nozzle when an air supply source for said fluidic control circuit and said fluidic trigger pulse generator means is stopped.

13. A fuel supply device according to claim 4, wherein a valve means is provided to intercept said fluidic trigger pulses when the vacuum in said fuel-air mixture supply passage is lower than a predetermined level.

14. A fuel supply device according to claim 2, wherein air branched from a fluid source for said fluidic control circuit and said fluidic trigger pulse generator means is introduced into exhaust gas passages of the engine.

References Cited

UNITED STATES PATENTS

| | | | |
|---|---|---|---|
| 3,388,898 | 6/1968 | Wyczaler | 123—119 X |
| 3,389,894 | 6/1968 | Binder | 123—119 X |
| 3,477,699 | 11/1969 | Drayer | 123—119 X |
| 3,532,081 | 10/1970 | Eastman | 123—103 R |

WENDELL E. BURNS, Primary Examiner

U.S. Cl. X.R.

123—DIG 10, 103 R, 139 R, 139 AW; 261—DIG 69, 39; 137—81.5

UNITED STATES PATENT OFFICE
CERTIFICATE OF CORRECTION

Patent No. 3,616,782          Dated November 2, 1971

Inventor(s)   Kazuma MATSUI and Takashi YAMADA

It is certified that error appears in the above-identified patent and that said Letters Patent are hereby corrected as shown below:

In the heading, read "Claims priority, application Japan, Dec. 27, 1968, 43/862" as --Claims priority, applications Japan, Dec. 27, 1968, 44/862; May 12, 1969, 36384; May 15, 1969, 37868; June 5, 1969, 52664; July 8, 1969, 53992.--

Signed and sealed this 16th day of May 1972.

(SEAL)
Attest:

EDWARD M. FLETCHER, JR.
Attesting Officer

ROBERT GOTTSCHALK
Commissioner of Patents